(No Model.)
G. W. KIRKPATRICK & J. B. RALSTON.
SEEDING MACHINE.
No. 485,948. Patented Nov. 8, 1892.
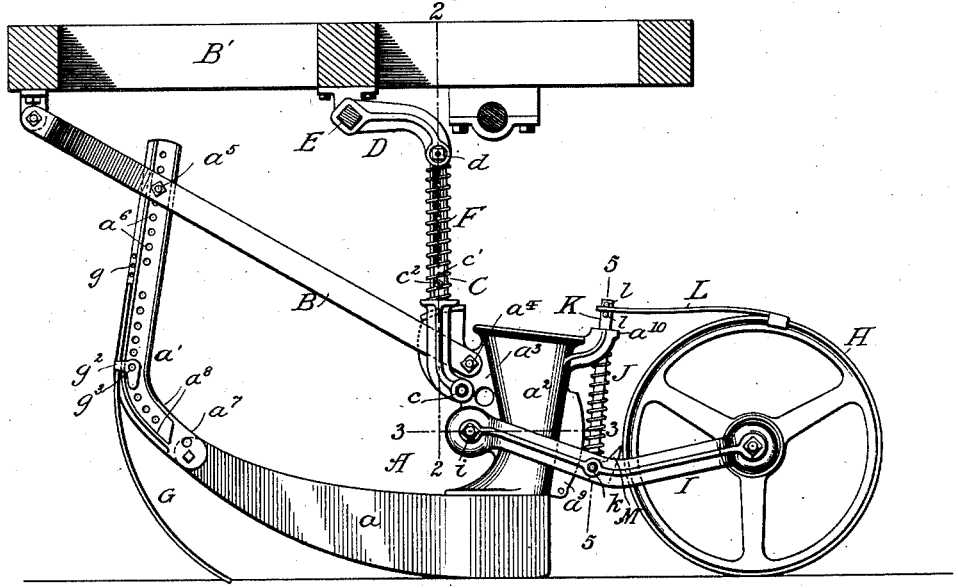
Fig. 1.
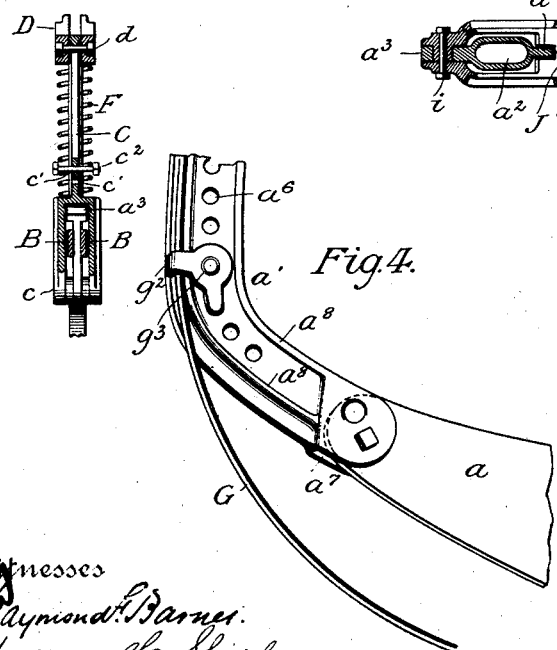
Fig. 2.
on line 2-2.
Fig. 4.
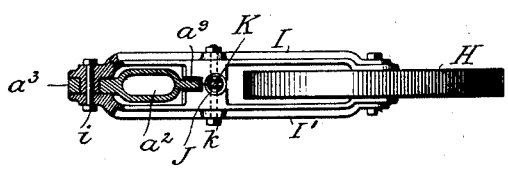
Fig. 3.
on line 3-3.
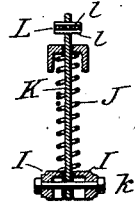
Fig. 5.
on line 5-5.
Witnesses
Raymond F. Barnes.
William H. Shipley
Inventors
G. W. Kirkpatrick
J. B. Ralston
By P. T. Dodge
Attorney

UNITED STATES PATENT OFFICE.

GEORGE W. KIRKPATRICK, OF MACEDON, NEW YORK, AND JAMES B. RALSTON, OF VERNON, TEXAS; SAID RALSTON ASSIGNOR TO HELEN M. KIRKPATRICK, OF MACEDON, NEW YORK.

SEEDING-MACHINE.

SPECIFICATION forming part of Letters Patent No. 485,948, dated November 8, 1892.

Application filed August 26, 1891. Serial No. 403,803. (No model.)

*To all whom it may concern:*

Be it known that we, GEORGE W. KIRKPATRICK, of Macedon, county of Wayne, and State of New York, and JAMES B. RALSTON, of Vernon, county of Wilbarger, and State of Texas, have invented a new and useful Improvement in Seeding-Machines, of which the following is a specification.

This invention relates to that class of seeding-machines in which a series of runner-hoes to open the furrows and direct the falling seed therein are used in connection with follower or pressure wheels traveling behind the hoe.

The invention has reference to various improvements in the construction of the hoe and attendant parts, and particularly to the means for guiding and adjusting the hoe and for guiding and adjusting the follower-wheel.

In the accompanying drawings, Figure 1 represents in side elevation our hoe and its adjuncts in operative relation to the main frame. Fig. 2 is a vertical cross-section on the line 2 2. Fig. 3 is a horizontal cross-section on the line 3 3. Fig. 4 is a perspective view of the forward end of the runner. Fig. 5 is a vertical cross-section on the line 5 5.

Referring to the drawings, A represents the runner-hoe, consisting of the longitudinal blade or runner $a$, its carrying-arm $a'$ at the front, and the upright tube or boot $a^2$, rigidly attached at the rear end. With the exception of the details hereinafter pointed out, the hoe is of essentially the same construction as those now in general use.

B represents a drag-bar consisting of two longitudinal bars having their forward ends horizontally separated and jointed to the main frame B', so that their rear ends may rise and fall. At the rear end the drag-bar embraces a vertical flange $a^3$, formed on the front of the tube, and is connected thereto by a through-bolt $a^4$. The arm $a'$ at the forward end of the runner is extended upward between the two parts of the drag-bar and secured in place by a through-bolt $a^5$, passed through one of a series of holes $a^6$ in the arm. The hoe, being thus connected rigidly at both its front and its rear ends to the drag-bar, is free to swing upward and downward therewith in order to adapt itself to the undulations of the surface of the ground. By changing the bolt $a^5$ from one to another of the holes $a^6$ the angle or inclination of the runner in a fore-and-aft direction and in relation to the drag-bar may be modified at will, as variations in the character of the soil or other controlling circumstances may render advisable.

In order to prevent the accumulation of rubbish at the forward end of the runner-blade, it is inserted into and secured within a vertical notch $a^7$, formed in the lower end of the arm $a'$, which is bent rearward and downward to meet the runner-blade, as shown. The arm $a'$ is strengthened and stiffened by longitudinal flanges $a^8$.

As an additional means of preventing the accumulation of rubbish at the front of the runner, and for the purpose of pressing down cornstalks and other objects that the runner may cut therethrough, the front of the runner is provided with one or more spring-arms G, attached to the upturned end of the runner and extending thence downward and rearward, so as to ride over and hold down the stalks and other surface rubbish—such as straw, weeds, or stubble. This spring may be attached to the runner in any convenient manner; but its upper end is commonly bent laterally and seated in one of a series of holes $g$, formed in the runner-arm for the purpose. It is secured in place by means of a clip-plate $g^2$, held by a bolt $g^3$.

For the purpose of raising and lowering the runner and of applying a controllable downward pressure thereto the upright arm C is provided, the lower end of which is forked and placed astride of the flange $a^3$ on the runner and connected thereto by a transverse pivot-bolt $c$. The upper end of the arm C is flattened and slotted vertically and passed through the slotted end of a crank-arm D, which is mounted on a horizontal rock-shaft E and provided with a transverse pin $d$, passed loosely through the slot in the arm C. The rock-shaft E will carry a series of the arms D, one for each hoe, and will be provided with the usual connections by which to turn it and lock it in different positions. Each of the arms C is encircled by a spiral spring F, bearing at its lower end on a shoulder on the arm and at its upper end beneath and against the crank-arm D, the end of which is widened sufficiently to give it a firm bearing on the spring.

When the rock-shaft is turned to throw the crank-arms D downward, the latter compress the springs, which apply a corresponding downward pressure upon the hoes. When the shaft and crank-arms are turned in the opposite direction, the hinge $d$ acts on reaching the upper ends of the slots to lift the arms C and thereby raise the hoe.

The slotted arm C is provided near its lower end with a series of transverse holes $c'$ at different heights to receive a transverse bolt $c^2$, which may be employed to sustain the lower end of the spring at different heights in order to vary its normal tension, and thus cause it to apply more or less pressure in proportion to the depression of the crank-arms.

The vertical flange $a^3$ has its upper end widened, as shown in Fig. 2, so as to bear closely between the branches of the arm C in order to hold the shoe the more firmly in an upright position and prevent it from tipping or canting sidewise.

H represents the follower or pressure wheel, which may be made of any suitable size and form, but which is preferably cast complete in one piece, as shown, with a flat periphery and three spokes, it being found that the three spokes uniformly spaced are free from the liability to accumulate and carry foreign matters which attend the use of ordinary wheels having a large number of spokes. The wheel is seated between and carried by the rear ends of two parallel longitudinal arms I I', which lie on opposite sides of the runner, being connected by and mounted upon a horizontal pivot-bolt $i$, passed through the flange $a^3$ on the front of the runner-tube. The forward ends of these arms are made of flat circular form in order to have an extended bearing on the flange, which is correspondingly shaped, so that the arms are prevented from swaying laterally. The arms are also guided vertically, so as to keep the wheel at all times directly behind the runner and in the furrow by a vertical flange $a^9$, formed on the rear side of the runner-hoe and bearing between bosses or projections on the inner sides of the wheel-carrying arms, as shown in Fig. 3.

The wheel-carrying arms are urged downward in relation to the runner by means of a spiral spring J, seated at its lower end upon the arms and at its upper end beneath an arm $a^{10}$ on the back of the hoe. The spring is guided and held in place by a vertical bar K, seated at its lower end upon the bolt $k$, passing through the wheel-carrying arm. The upper end of the bar K passes through and is guided by the arm $a^{10}$ on the runner-tube, so that it may slide freely upward and downward as the wheel and arms rise and fall in relation to the runner.

L is a scraper-arm having one end adapted to fit over the periphery of the wheel and the opposite end attached to the top of the vertical bar K, so that as the arms swing upward and downward through the wheel they act through the rod to raise and lower the scraper, thus maintaining its relation to the wheel. The scraper-arm is by preference slipped loosely over the upper end of the rod K and secured by two pins $l\,l$, passed through the bar, this arrangement permitting the rear or active end of the scraper to rise and fall as far as may be necessary to adapt itself to the surface of the wheel and to prevent accumulations thereon.

It will be observed that the active end of the scraper L extends across the periphery of the wheel and that its ends are turned downward past the edges of the wheel, whereby it is the better adapted for detaching the adhering mass of earth which may project laterally beyond the wheel.

An additional scraper M to act on the periphery of the wheel may also be attached rigidly to the wheel-carrying arms by the through-bolt $k$, as shown, or otherwise.

Having thus described our invention, what we claim is—

1. In a seeding-machine, the combination of a runner-hoe and a backwardly-curved spring-arm attached to the front part thereof and extending under the runners, substantially as shown and described, to hold down stalks and other obstructive matters that the runner may ride thereover.

2. In a seeding-machine, the combination of the runner-hoe, the vertical pressure-arm pivoted thereto and having its upper end slotted, the crank-arm connected to the pressure-arm by a bolt passing through the slot therein, the spring encircling the pressure-arm, and an adjustable seat for the spring, by the adjustment of which the spring-pressure may be varied.

3. The combination of the runner-hoe having a guide $a^{10}$, the follower-wheel, the wheel-carrying arms jointed to the hoe to swing vertically, the bar K, jointed to said arms and extending through the guide $a^{10}$, the spring encircling the rod between the guide and the wheel-carrying arms to press the latter down, and the wheel-scraper attached to the upper end of the bar K.

4. In a seeding-machine, the pressure-arm C, having the forked lower end, in combination with the runner-hoe having the vertically-extended flange fitted between and against the rear ends of the pressure-arm, whereby the hoe is maintained in an upright position and prevented from tipping sidewise.

5. In combination with the hoe, the wheel-carrying arms jointed thereto to swing vertically, the pressure-spring seated between the arms and a projection on the hoe, the guide-bar extending from the arms through the spring and the projection on the hoe, and the scraper attached to the upper end of said bar.

In testimony whereof we hereunto set our hands, this 10th day of July, 1891, in the presence of two attesting witnesses.

GEORGE W. KIRKPATRICK.
JAMES B. RALSTON.

Two witnesses as to signature of George W. Kirkpatrick:
T. P. RIPLEY,
W. L. ACKER.

Two witnesses as to signature of J. B. Ralston:
C. M. RALSTON,
J. L. SWARTWOOD.